United States Patent

Calzaferri et al.

[15] 3,647,353

[45] Mar. 7, 1972

[54] METHOD AND APPARATUS FOR PROCESSING CELLULOSE-CONTAINING TEXTILES WITH THE VAPORS FROM AN AZEOTROPIC LIQUID COMPRISING AN ACIDIC CATALYST

[72] Inventors: Hans Calzaferri, Ilanz; Werner Kunz, Uerikon; Martin W. Schwemmer, Urdorf; Max Wyler, Winterthur, all of Switzerland

[73] Assignee: Triatex International AG fur Textile Forschung und Entwicklung, Zurich, Switzerland

[22] Filed: Aug. 9, 1967

[21] Appl. No.: 659,429

[30] Foreign Application Priority Data

Aug. 24, 1966  Switzerland...............12,222/66

[52] U.S. Cl..................8/116.3, 8/149.2, 34/31, 34/37, 34/85, 34/160, 8/116.4, 8/DIG. 15
[51] Int. Cl............D06m 1/16, D06m 13/38, D06m 13/14
[58] Field of Search..................8/116.3, 149.2, DIG. 15

[56] References Cited

UNITED STATES PATENTS

| | | | |
|---|---|---|---|
| 2,679,449 | 5/1954 | Schappell | 8/116.4 |
| 2,235,141 | 3/1941 | Dreyfus et al. | 8/116.3 |
| 2,441,859 | 5/1948 | Weisberg et al. | 8/116.4 |
| 3,264,054 | 8/1966 | Reinhardt et al. | 8/116.4 |
| 3,450,485 | 6/1969 | Reinhardt et al. | 8/116.3 |

FOREIGN PATENTS OR APPLICATIONS

| | | | |
|---|---|---|---|
| 954,275 | 4/1964 | Great Britain | 8/DIG. 15 |
| 980,980 | 1/1965 | Great Britain | 8/116.4 |

OTHER PUBLICATIONS

Guthrie, Textile Research Journal, Vol. 29, pp. 834–836 (1959)

*Primary Examiner*—George F. Lesmes
*Assistant Examiner*—J. Cannon
*Attorney*—Parrott, Bell, Seltzer, Park & Heard

[57] ABSTRACT

Method and apparatus for finishing cellulose-containing textile material wherein the material is treated with an acid catalyst by contacting the material with the vapor of a liquid azeotropic mixture containing the acid catalyst, and wherein the temperature of the liquid azeotropic mixture is controlled to regulate the amount of catalyst present in the vapor phase for contact with the textile material.

6 Claims, 1 Drawing Figure

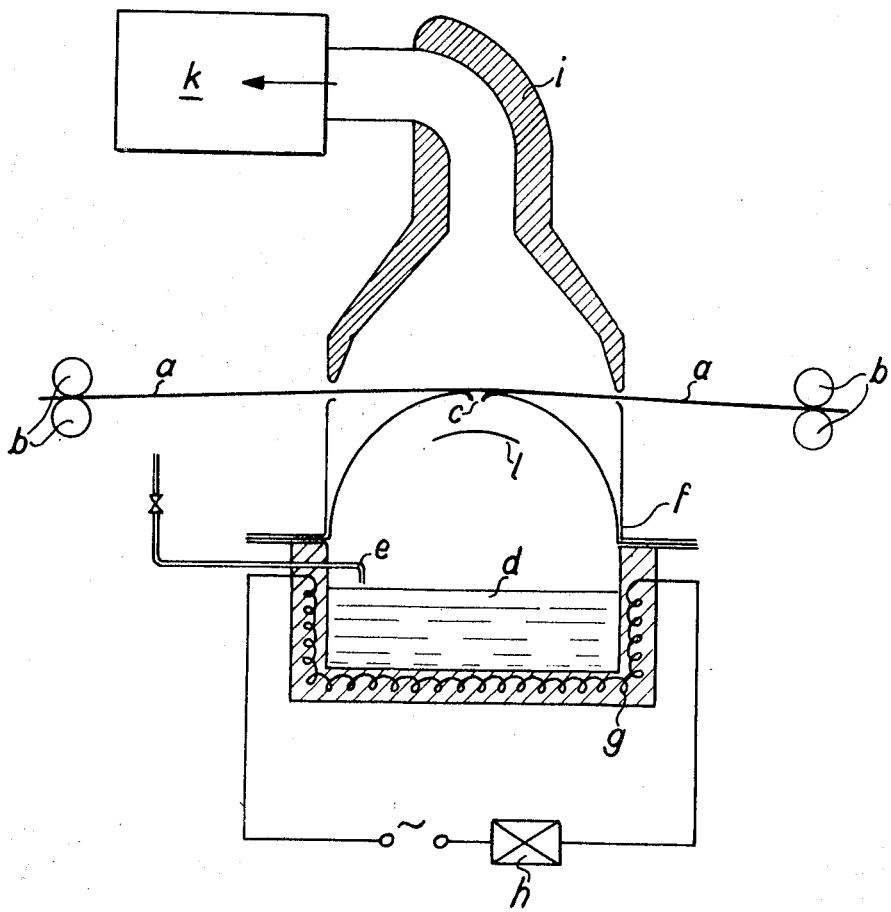
INVENTORS:
HANS CALZAFERRI, WERNER KUNZ,
MARTIN W. SCHWEMMER and MAX WYLER
By Parrott, Bell, Seltzer, Park & Heard
ATTORNEYS

METHOD AND APPARATUS FOR PROCESSING CELLULOSE-CONTAINING TEXTILES WITH THE VAPORS FROM AN AZEOTROPIC LIQUID COMPRISING AN ACIDIC CATALYST

The invention relates to a method of catalysing chemical reactions such as are used for example in the finish processing of cellulose-containing textiles. Among other things, this results in improvements in the creasing behavior by reactions of the cellulose with cross-linking agents under the influence of gaseous acid catalysts. In the methods known hitherto, using gaseous acid catalysts, the required concentration of acid gas in the reaction chamber is obtained by evaporation from anaqueous solution of the gas or by mixing the pure gaseous catalyst with an inert gas to effect the required dilution.

One can classify the methods known hitherto for cross-linking cellulose by gas-phase catalysis into those processes on the one hand in which the gaseous catalyst is introduced in a first stage and the reaction then proceeds to completion in a second stage outside the gas chamber, and on the other hand those processes, also known, in which the reaction proceeds to completion within the gas chamber. Thus for example, in accordance with Swiss Pat. No. 407,940 the fabric impregnated with the cross-linking agent moves through the chamber containing the acid gas and becomes charged with the necessary quantity of catalyst and the reaction is finally allowed to proceed to completion outside the gas chamber by being left for a period. On the other hand U.S. Pat. No. 2,235,141 describes a single-stage method of operation in which the cross-linking is obtained by leaving the goods for a period in the presence of the acid catalyst in the gas chamber. The time necessary for the application of the acid catalyst is referred to in the following description as the "contact time" while the time necessary for completing the reaction is referred to as the "delay time." The overall reaction time is thus the sum of the contact time and the delay time. In the first-mentioned two-stage type of method the contact time and the reaction time are not identical, but in the single-stage methods they are.

However, besides the contact time, a number of further factors have an influence on the quantity of catalyst taken up by the textile material. In particular there are the speed of movement of the material, the water content of the textile material entering the contact chamber and the concentration and also the temperature of the acid gas.

The methods known hitherto for gas-phase catalysed cross-linking of the cellulose all have the disadvantage that the quantity of acid catalyst introduced during the contact period undergoes substantial variations in concentration. With the other conditions constant, such as speed of travel of the material, moisture content and temperature, the variation in the volume fraction of the acid gas in the contact chamber is primarily responsible for these uncertainties. These undesired variations in concentration originate in the method of evaporating the acid gas from one of its solutions, technically simple in itself, in that the evaporation is accompanied by a continuous change in the concentration in the fluid and the gas phase. However, even the other possibility of mixing together pure acid gas and an inert gas is not satisfactory from the practical standpoint since exact measurement of the gas quantities can only be done with a substantial amount of equipment and at high cost. To monitor analytically in a continuous manner the content of acid gas in the contact chamber, a possibility to be considered in both cases, involves complicated equipment and consequent maintenance problems.

As a consequence of the variations of the concentration of catalyst actually impinging on the web of material, the contact time and delay time must be exceeded by a substantial safety factor, allowing indeed any potential under concentration to be counteracted, but on the other hand an extended contact time results in the danger of excess concentration of the catalyst and consequent damage to the fibers. Moreover, extended contact times are also undesirable from the point of view of good utilization of the equipment as they have an adverse effect on the economy of an installation. For these reasons it is desirable to have available a method which allows the quantity of catalyst necessary for the reaction to be brought into contact with the textile material in a simple manner and to hold this quantity within narrow limits by its simple means. It has now been found that this aim can be achieved by arranging that the gaseous acid catalysts are converted into the gas phase by evaporation from azeotropic mixtures, the catalysts are allowed to act on the textile materials at a low temperature for a short contact time and the amount of acid catalyst in the gas phase is adjusted by controlling the supply of energy to the azeotropic mixture. The use of azeotropic mixtures simplifies the control of the concentration of the gaseous catalyst and thereby decisively simplifies the catalysis of the reaction to be carried out on the textile material as the only thing that needs to be controlled is the quantity of energy supplied to the azeotropic mixture. Whereas in the previously proposed processes complicated control methods were necessary (the concentration of acid catalyst had to be continuously determined and adjusted either in the gas chamber or in the liquid phase) the use of azeotropic mixtures in the manner according to the invention permits the adjustment to any desired amount of gaseous acid catalyst by a simple temperature adjustment while one is working below the boiling point of the azeotropic mixture. In the gas chamber there is established a partial pressure according to the physical properties of the catalyst employed and thereby a concentration is established which always remains constant.

For the practical performance of the process it is accordingly necessary simply to hold ready in a contact chamber at a suitable point apparatus for azeotropic mixture at a predetermined temperature and to ensure that the same temperature is also present in the contact chamber. The amount of gaseous acid catalyst in the vapor will accordingly always be the same under constant conditions, regardless of the quantity of catalyst absorbed by the textile material passing through the reaction chamber, since at a given temperature the azeotropic mixture in the sump automatically maintains a predetermined partial pressure and thereby a predetermined amount of gaseous acid catalyst in the reaction chamber. This partial pressure depends only on the temperature and accordingly in the practical performance of the process it can be adjusted to the desired value in the simplest possible manner.

The precess according to the invention gives particular advantages in practice when working with boiling azeotropic mixtures. Boiling azeotropic mixtures produce a current of gas made up of the components of the azeotropic mixture, of which the amount depends solely on the amount of heat supplied to the sump and this can be adjusted very easily by known energy-controlling equipment. The adjustment of the supply of energy will normally be undertaken on the basis of the desired concentration of catalyst at the fabric. It can, if necessary, be controlled automatically be measuring this concentration by electrical methods.

If it is desired to work without a sump the thermostatic adjustment of the supply of energy can be achieved by regulating the quantity of azeotrope introduced into the evaporator and continuously converted to the gas phase.

In the practical construction the textile material can move over one or more slits through which the stream of gas emerges and the speed of the stream of gas passing through the textile material can be determined by the cross section of these slits. The significant consequences in practice of such an arrangement are short contact times hitherto unobtainable and of the order of seconds and in some cases indeed fractions of seconds. These extremely short contact times make possible high speed of travel of the goods and a compact construction for the equipment necessary for delivering the gaseous acid catalyst. Such equipment can also be installed for operating below the boiling point of the azeotropic mixture. By blowing in a constant stream of an inert gas the result can be obtained that the gaseous acid catalyst flows out through the slits onto the textile material at a predetermined speed despite the fact that its constant partial pressure lies below atmospheric pressure.

The instant at which the acid catalyst is removed from the textile material depends on the speed of the reaction to be carried out. According to this speed the acid catalyst is removed either directly after passage through the apparatus for causing contact with the gaseous acid catalyst or after the interposition of a delay time. The removal is performed in a known manner by washing out, with or without the use of neutralizing agents, by intensive aerating extraction, etc.

In the performance of chemical reactions on cellulose-containing substrates, employing gaseous catalysts, it has hitherto often been difficult to bring the reaction into action at the right time as it was found to be impossible to deliver the necessary quantity of gaseous catalyst to the textile material within a short period. According to the invention the quantity of acid catalyst brought into contact with the textile material per unit time is now substantially increased in that one ensures a temperature drop between the gaseous acid catalyst and the textile material. The textile material passing through the gas chamber should have a temperature which is at least 20° C. below that of the gaseous acid catalyst applied to it. This step results in the achievement of condensation of the acid catalyst as well as absorption on the surface of the textile material as it becomes cooled on contact with the colder textile material and this results in a further reduction in the contact time that is required. This manner of operation gives the particular advantage in the practical performance of the present invention that with different requirements of catalyst, for example by variations in the weight per square meter or changing widths of cloth, the control of the necessary quantity of catalyst can be obtained by the two parameters of speed of travel of the goods and temperature drop between the goods and the gas chamber.

Hydrochloric acid gas has been found to be of particular merit as the gas phase catalyst. The azeotropic aqueous hydrochloric acid mixture contains about 22 percent by weight of hydrochloric acid and has a ratio of hydrochloric acid to water in the gas phase which is practically constant over the whole range from room temperature up to the boiling point. Of the chemical reactions catalyzed in the manner according to the invention, the ones of particular significance in technology are the cross-linking reaction for improving the crease resistance and noniron properties of cellulose-containing textile fabrics. The process can also be employed for the fixing of deformations in textile fabrics such as calender effects, stamped patterns, etc. It is further suitable for fixing pleats and seams and producing crease resistance in complete articles of clothing such as trousers, shirts and the like.

In recent years cross-linking processes have become known in which the chemical reactions occur under conditions of regulated slight swelling of the cellulose molecule. The catalysis of such systems with anhydrous hydrochloric acid has already been proposed in this connection in various forms. The use of gaseous hydrochloric acid containing water vapor, such as is produced from the azeotropic mixture, appears to render impossible the maintenance of a regulated and slight degree of swelling of the cellulose. Unexpectedly it has now been found that the cellulose absorbs preferentially the acid component of the mixture of hydrochloric acid gas and water vapor obtained by evaporation of the azeotropic mixture. Accordingly it is not necessary even in view of this point to employ for the acid gas catalyst anhydrous hydrochloric acid gas, the use of which results in the disadvantages mentioned above, since the employment of a vapor mixture of hydrochloric acid and water has little influence on the swelling behavior of the cellulose on account of the preferential absorption of the hydrochloric acid.

Other acid gases are also suitable for the process according to the invention, in the form of azeotropic mixtures, for example, an azeotropic mixture of formic acid and water with a formic acid content of about 70 percent by weight. The invention also includes the use of nonaqueous azeotropes, such as for example, an azeotropic mixture of dioxan and formic acid with a formic acid content of about 25 percent by weight.

Compounds of which the reactions among themselves and/or with the cellulose-containing substrate can be catalysed on the cellulose in accordance with the present invention, are chemicals which are suited to reacting under acid conditions, in particular the known cross-linking means for cellulose. The application of the chemicals for the reaction is preferably carried out before exposure to the gaseous acid catalyst; it can if necessary however equally well be carried out simultaneously with or after the application of the catalyst.

The following example describes a possibility for the practical performance of the process according to the invention. The textile material employed was a scorched (singed) desized, bleached, mercerized and optically prebrightened poplin fabric made of 100 percent worsted (combed) cotton having a weight of 120 grams per square meter. The fabric containing 52 warp threads per centimeter of a metric yarn fineness of 68 and containing 27 weft threads of metric yarn fineness 60 was steeped in a dressing or finishing mixture containing 100 grams per liter of dimethylol-dihydroxyethylene urea, 40 grams per liter of a commercially available 25 percent by weight polyethylene emulsion and 0.5 grams per liter of a nonionic wetting agent. Finally it was squeezed out on a two-roller Foulard machine to a liquor content of 65 percent relative to the dry weight of the material. The fabric was then dried on a stretching frame at 130° C. to a residual moisture content of 5 percent and cooled over rollers to a temperature of 35° C. Thereafter the goods were passed through a gas-generating apparatus illustrated diagrammatically in FIG. 1 at a speed of 60 meters per minute, resulting in a contact time over the 20-mm.-wide slit of 0.02 seconds. The apparatus contained the azeotropic hydrochloric acid mixture and the fabric showed a takeup of 0.8 percent hydrochloric acid and 0.4 percent water measured relative to the weight of the dry goods.

In the FIGURE the fabric (a) runs between the guide rollers (b) over the slit (c). The azeotropic mixture of hydrochloric acid and water (d) is situated in the acid resistant container (f) to which is supplied the required energy through the heating element (g) via the controller (h). The azeotropic mixture (d) is maintained at its boiling point (120.4° C. at normal pressure). The shield (l) prevents spray reaching the fabric (a). The azeotropic mixture (d) is supplied through the level-controlled feedpipe (e). Above the fabric (a) there is disposed the heated extractor hood (i) of which the inside wall is maintained at a constant surface temperature of 130° C. The acid gases present above the fabric are drawn off by the extractor device (k).

The treated fabric web passes the guide rollers (b) and then passes directly into a wide washing machine where it is washed to a neutral condition. It is finally finished in a normal manner.

Samples of the treated fabric were tested for their technological characteristics together with the untreated fabric after being washed three times under boiling conditions. The test gave the following results:

|  | Untreated Fabric | Treated Fabric |
| --- | --- | --- |
| Wash/Wear number (Monsanto) | | |
| Spin dry | under 2 | 4.2 |
| Wet creasing angle (Monsanto) | | |
| Sum of the values for the warp and weft in degrees | 190 | 285 |
| Dry creasing angle (Monsanto) | | |
| Sum of the values for warp and weft in degrees | 160 | 248 |
| Abrasion resistance (grab method) Measured in kilograms in the direction of the weft | 26.5 | 16.2 |

We claim:

1. In a process of finishing cellulose-containing textile material wherein the material is treated with a cross-linking chemical and an acid catalyst, the improvement therein comprising the steps of contacting the textile material with the vapor of a liquid azeotropic mixture containing the acid catalyst while maintaining the temperature of the textile material lower than the vapor temperature to condense the vapor on the textile material, and controlling the temperature of the liquid azeotropic mixture to regulate the rate of vaporization of the azeotropic mixture and thereby the amount of acid catalyst present in vapor phase for contact with the textile material.

2. A process as defined in claim 1 wherein the azeotropic mixture comprises water and an acid selected from the group consisting of hydrochloric and formic acids.

3. A process as defined in claim 1 wherein the vapor temperature is below the boiling point of the liquid azeotropic mixture, and heat-producing energy is applied to the azeotropic mixture and regulated to maintain the liquid mixture at a constant temperature below its boiling point.

4. A process as defined in claim 1 wherein the temperature of the textile material being contacted by the vapor is maintained at least 20° C. lower than the temperature of the vapor.

5. A process as defined in claim 1 wherein the textile material is in web form and is contacted with the vapor by passing the web over a slit-shaped opening of a substantially closed vessel containing the vapor, and wherein the period of contact of the vapor with the textile material is less than thirty seconds.

6. A process as defined in claim 5 including the step of removing the vapor containing the acid catalyst from the textile material, immediately after the period of contact therewith, by suction.

* * * * *